United States Patent
Singh et al.

(10) Patent No.: US 11,616,732 B2
(45) Date of Patent: Mar. 28, 2023

(54) ENHANCED REDEPLOYING OF COMPUTING RESOURCES

(71) Applicant: Hewlett Packard Enterprise Development LP, Houston, TX (US)

(72) Inventors: Siddhartha Singh, Bangalore Karnataka (IN); Animesh Sharma, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/301,955

(22) Filed: Apr. 20, 2021

(65) Prior Publication Data

US 2021/0377184 A1    Dec. 2, 2021

(30) Foreign Application Priority Data

May 29, 2020   (IN) .............................. 202041022681

(51) Int. Cl.
  *G06F 15/173*   (2006.01)
  *H04L 47/762*   (2022.01)
  (Continued)

(52) U.S. Cl.
  CPC ........ *H04L 47/762* (2013.01); *G06F 11/3409* (2013.01); *G06N 20/00* (2019.01);
  (Continued)

(58) Field of Classification Search
  CPC ... H04L 47/762; H04L 47/781; H04L 47/822; H04L 47/803
  See application file for complete search history.

(56) References Cited

U.S. PATENT DOCUMENTS 10,009,251 B1 *  6/2018  Koster ................. H04L 67/141
10,585,693 B2     3/2020  Aydelott et al.
(Continued)

FOREIGN PATENT DOCUMENTS

CN        110780998 A     2/2020

OTHER PUBLICATIONS

Kubernetes Authors, Kubernetes Scheduler, https://kubernetes.io/docs/concepts/scheduling-eviction/kube-scheduler/, Apr. 7, 2020, retrieved from https://web.archive.org/web/20200419113434/https://kubernetes.io/docs/concepts/scheduling-eviction/kube-scheduler/.
(Continued)

*Primary Examiner* — Yves Dalencourt
(74) *Attorney, Agent, or Firm* — Trop, Pruner & Hu, P.C.

(57) ABSTRACT

Examples described herein relate to method, resource management system, and non-transitory machine-readable medium for redeploying a computing resource. Data related to a performance parameter corresponding to a plurality of computing resources deployed on a plurality of host-computing nodes may be received. The performance parameter is associated with one or both of: communication between computing resources of the plurality of computing resources, or communication of the plurality of computing resources with a network device. Further, for a computing resource of the plurality of computing resources, a candidate host-computing node is determined from the plurality of host-computing nodes based on the data related to the performance parameter and the computing resource may be redeployed on the candidate host-computing node.

18 Claims, 6 Drawing Sheets

(51) Int. Cl.
| | |
|---|---|
| *H04L 47/78* | (2022.01) |
| *G06N 20/00* | (2019.01) |
| *H04L 47/70* | (2022.01) |
| *G06F 11/34* | (2006.01) |
| *H04L 47/80* | (2022.01) |

(52) U.S. Cl.
CPC .......... *H04L 47/781* (2013.01); *H04L 47/803* (2013.01); *H04L 47/822* (2013.01)

(56) References Cited

U.S. PATENT DOCUMENTS

| | | | |
|---|---|---|---|
| 10,754,696 B1* | 8/2020 | Chinnam | G06F 11/1453 |
| 2019/0173765 A1 | 6/2019 | Bertran et al. | |
| 2019/0312772 A1* | 10/2019 | Zhao | H04L 41/12 |
| 2021/0208919 A1* | 7/2021 | Souhrada | H04L 47/76 |

OTHER PUBLICATIONS

Liu, B., et al.; "K-PSO: An Improved PSO-Based Container Scheduling Algorithm for Big Data Applications"; Int J Network Mgmt.; Jan. 22, 2020; pp. 1-16.

Lv, J., et al.; "A Container Scheduling Strategy Based on Machine Learning in Microservice Architecture"; Jul. 2019; pp. 65-71; IEEE.

Ungureanu, O., et al.; "Kubernetes Cluster Optimization Using Hybrid Shared-State Scheduling Framework"; Jul. 2019; pp. 1-12.

* cited by examiner

ENHANCED REDEPLOYING OF COMPUTING RESOURCES

BACKGROUND

Data may be stored on computing nodes, such as a server, a storage array, a cluster of servers, a computer appliance, a workstation, a storage system, a converged system, a hyper-converged system, or the like. The computing nodes may host computing resources that may generate or consume the data during their respective operations.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system.

Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Data may be stored on computing nodes, such as a server, a storage array, a cluster of servers, a computer appliance, a workstation, a storage system, a converged system, a hyper-converged system, or the like. The computing nodes may host computing resources that may generate or consume the data during their respective operations. Examples of such computing resources may include, but are not limited to, a virtual machine, a container, a pod, a database, a data store, a logical disk, or a containerized application. Several such computing nodes may be interconnected to form a networked system, for example.

In some networked systems, certain number of computing nodes may be arranged in a cluster. Further, in some examples, a networked system may include several such clusters of the computing nodes. During operation of the computing resources in the networked system, the computing resources may execute a set of instructions to complete a given computing task. Further, during the operation, the computing resources may also interact among themselves and/or interact with additional network devices within their respective clusters or outside of their respective clusters to complete the given computing task.

Depending upon an operating status of the computing nodes and/or certain defined rules, the computing resources may be moved from one computing node to another computing node. Accordingly, the moved computing resources may then be operationalized on the respective new computing node. In certain instances, manual intervention by a human operator is required to effect such movement of the computing resources. As will be understood, as the size of these deployments grows, it is difficult for the human operator to consider all possible movement scenarios and related implications, and keep revising the rules to ensure that the computing resources in a given cluster are running optimally. Therefore, there is a need for an enhanced system that monitors the computing resources and automatically generates recommendations to redeploy the existing computing resources in an optimal manner or schedule the upcoming computing resources appropriately and keeps learning to improve the recommendations over time.

Accordingly, a method, a resource management system, and a non-transitory machine-readable medium for redeploying a computing resource are presented. Data related to a performance parameter corresponding to a plurality of computing resources deployed on a plurality of host-computing nodes may be received. The performance parameter is associated with one or both of: communication between computing resources of the plurality of computing resources, or communication of the plurality of computing resources with a network device. Further, for a computing resource of the plurality of computing resources, a candidate host-computing node is determined from the plurality of host-computing nodes based on the data related to the performance parameter and the computing resource may be redeployed on the candidate host-computing node. In some examples, the candidate host-computing node may be determined using a machine-learning model based on the data related to a performance parameter.

As will be appreciated, the method and the resource management system in accordance with aspects of the present disclosure may facilitate enhanced redeployment of the computing resource so that inter-cluster communication frequencies among the computing resources and/or the network device may be reduced and the performance of applications utilizing the computing resources may be improved. Such enhancement may be achieved, at least in part, as the candidate host-computing node for a given computing resource is determined considering the performance parameter that is associated with one or both of: communication between computing resources of the plurality of computing resources, or communication of the plurality of computing resources with a network device. Therefore, when a given computing resource is redeployed on the candidate host-computing node, communication frequency of the given computing resource with other computing nodes within the same cluster or outside of the cluster in which the candidate host-computing node resides may be reduced. Accordingly, performance of application(s) utilizing the given computing resource may be improved.

Figure 1:
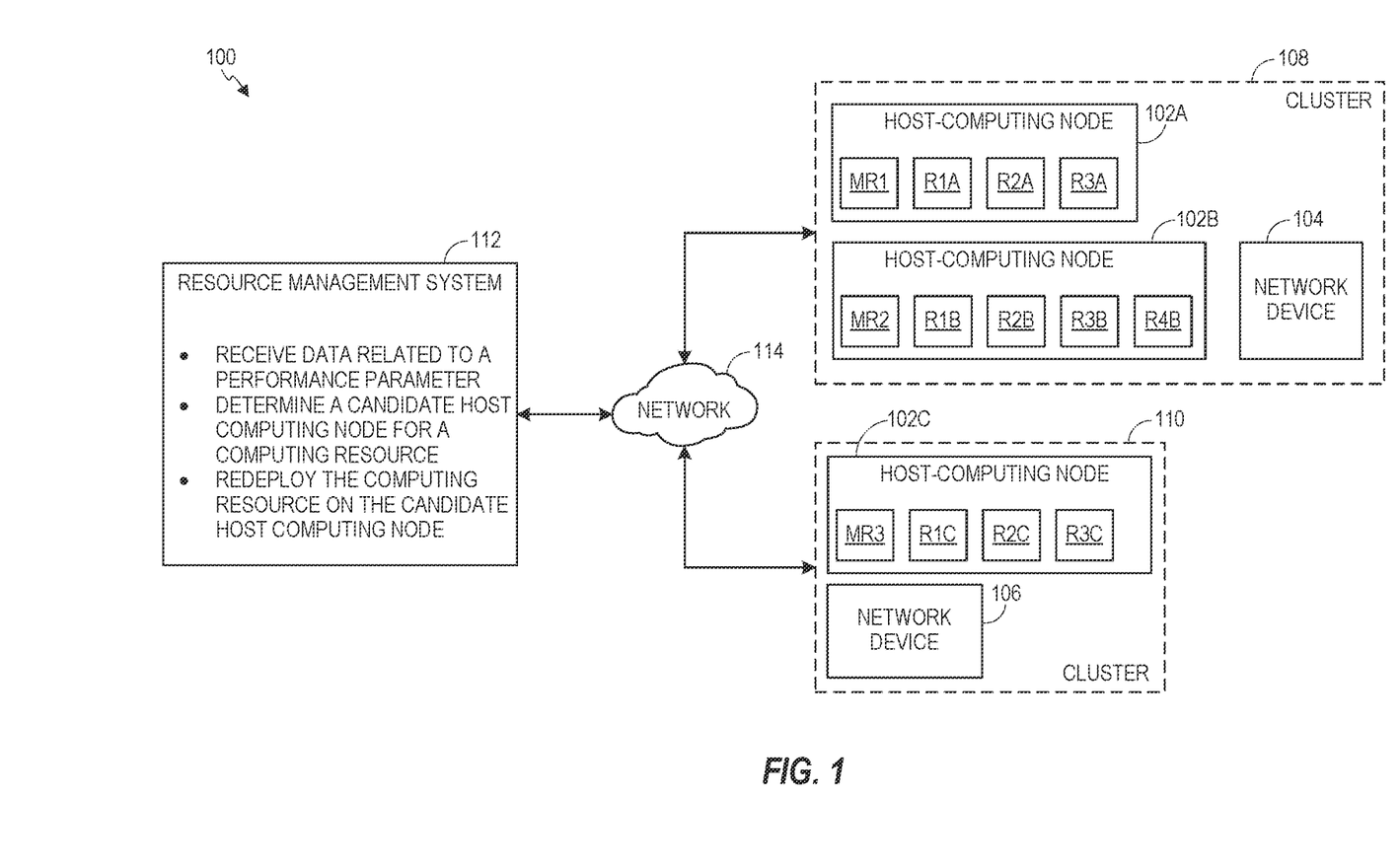
FIG. 1 depicts a networked system including a plurality of host-computing nodes hosting computing resources and a resource management system for managing redeployment of the computing resources, in accordance with an example.

Referring now to the drawings, in FIG. 1, a networked system 100 is depicted, in accordance with an example. In some examples, the networked system 100 may include a plurality of host-computing nodes 102A, 102B, and 102C, hereinafter, collectively referred to as host-computing nodes 102A-102C. In some examples, each of the host-computing nodes 102A-102C may be a device including a processor or microcontroller and/or any other electronic component, or a device or system that may facilitate various compute and/or data storage services. Examples of the host-computing nodes 102A-102C may include, but are not limited to, a desktop computer, a laptop, a smartphone, a server, a computer appliance, a workstation, a storage system, or a converged or hyperconverged system, and the like. In FIG. 1, although the networked system 100 is shown to include three host-computing nodes 102A-102C, the networked system 100 may include any number of host-computing nodes greater than two, without limiting the scope of the present disclosure.

Further, the networked system 100 may include certain network devices, for example, the network devices 104 and 106 that are accessible by one or more of the host-computing nodes 102A-102C during their respective operations. In particular, the network devices 104 and 106 may be accessible by the plurality of computing resources. In some examples, each of the network devices 104 and 106 may be a device including a processor or microcontroller and/or any other electronic component, or a device or system that may facilitate various compute and/or data storage services, for example. Examples of the host-computing nodes 102A-102C may include, but are not limited to, a server, a computer appliance, a storage system, or a converged or hyperconverged system, a network gateway, a network switch, a system hosting a database, a cloud based storage device or system, and the like. Although two network devices 104, 106 are shown in the networked system 100 of FIG. 1, in certain examples, the networked system 100 may also include any number of network devices, without limiting the scope of the present disclosure.

Furthermore, in some examples, the host-computing nodes 102A-102C and the network devices 104, 106 may be arranged in one or more clusters depending on various parameters including, but not limited to, geographic locations of the host-computing nodes 102A-102C. For example, host-computing nodes and network devices that are located in a common geographical region may be arranged in one cluster. In the example of FIG. 1, the host-computing nodes 102A, 102B and the network device 104 are arranged in a cluster 108 and the host-computing nodes 102C and the network device 106 are arranged in a cluster 110. As will be appreciated, there can be more than one clusters in the networked system 100, in certain examples.

Moreover, in some examples, each of the host-computing nodes 102A-102C may host one or more computing resources. In the example of FIG. 1, the host-computing node 102A is shown to host computing resources R1A, R2A, and R3A; the host-computing node 102B is shown to host computing resources R1B, R2B, R3B, and R4B; and the host-computing node 102C is shown to host computing resources R1C, R2C, and R3C. Although certain number of computing resources are shown as being hosted by each of the host-computing nodes 102A-102C as depicted in FIG. 1, the host-computing nodes 102A-102C may host any number of computing resources depending on respective processing and/or storage capabilities. The computing resources R1A, R2A, R3A, R1B, R2B, R3B, R4B, R1C, R2C, and R3C are, hereinafter, collectively referred to as the computing resources R1A-R3C. Examples of the computing resources R1A-R3C may include, but are not limited to, a virtual machine (VM), a container, and/or a pod. In some examples, all of the computing resources R1A-R3C may be either virtual machines (VMs), containers, or pods. In certain examples, while some of the computing resources R1A-R3C may be VMs, some of the computing resources R1A-R3C may be containers, and some of the computing resources R1A-R3C may be pods.

As will be understood, a computing resource such as a VM may be an instance of an operating system hosted on a given host-computing node via a VM host programs such as a hypervisor. Further, a computing resource such as a container may be a packaged application with its dependencies (e.g., operating system resources, processing allocations, memory allocations, etc.) hosted on a given host-computing node via a container host programs such as a container runtime (e.g., Docker Engine), for example. Further, in some examples, certain number of containers may be grouped to form a pod. For example, a set of containers that are associated with a common application may be grouped to form a pod.

In some examples, pods may be managed via a container-orchestration system, for example, Kubernetes. Further, in an implementation when the computing resources R1A-R3C are pods, the computing resources R1A-R3C may be managed via Kubernetes or any other container-orchestration system, for example. Further, in the networked system 100 if the computing resources R1A-R3C are pods, the host-computing nodes 102A-102C may be referred to as worker computing nodes and the clusters 108, 110 may be referred to as Kubernetes clusters, in some examples.

During operation of the computing resources R1A-R3C in the networked system 100, the computing resources R1A-R3C may execute several instructions to complete one or more tasks. In some examples, some of the computing resources R1A-R3C may form a part of a larger application where each of the participating computing resources may execute respective tasks for the larger application. Further, during the operation, the computing resources R1A-R3C may also interact among themselves and/or interact with additional network devices (e.g., the network devices 104, 106) via a network (described later) within their respective clusters or outside of their respective clusters to complete the given computing task. Accordingly, performance of an application that uses one or more the computing resources R1A-R3C may depend on a communication frequency and between the computing resources R1A-R3C and/or the network devices 104, 106 and corresponding network latencies.

For instance, if computing resources from one cluster communicate frequently with computing resources and/or network devices (e.g., storage systems) from a separate cluster, network latencies for such communications may be high and performance of an application utilizing these computing resources may be impacted. Similarly, in a given cluster, if computing resources hosted on one host-computing node frequently communicate with computing resources from other host-computing nodes, network latencies for such communications may also be high and performance of an application utilizing these computing resources may be impacted.

To that end, the networked system 100 may include a resource management system 112 that manages deployment of the computing resource across the host-computing nodes 102A-102C such that inter-cluster communication frequencies among the computing resources R1A-R3C and/or the network devices 104, 106 may be reduced to enhance performance of the application that utilizes the computing resources R1A-R3C. The resource management system 112, the host-computing nodes 102A-102C, and the network devices 104, 106 may be connected to each other via a network 114.

Examples of the network 114 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network 114 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 114 may be enabled via a wired (e.g., copper, optical communication, etc.) or wireless (e.g., Wi-Fi®, cellular communication, satellite communication, Bluetooth, etc.) communication technologies. In some examples, the network 114 may be enabled via private communication links including, but not limited to, communication links established via Bluetooth, cellular communication, optical communication, radio frequency communication, wired (e.g., copper), and the like. In some examples, the private communication links may be direct communication links between the resource management system 112, the host-computing nodes 102A-102C, and the network devices 104, 106.

The resource management system 112 may be a device including a processor or microcontroller and/or any other electronic component, or a device or system that may facilitate various compute and/or data storage services, for example. Examples of the resource management system 112 may include, but are not limited to, a desktop computer, a laptop, a smartphone, a server, a computer appliance, a workstation, a storage system, or a converged or hyperconverged system, and the like. Further, in certain examples, the resource management system 112 may be a virtual machine or a containerized application executing on a hardware in the networked system 100. The resource management system 112 may monitor the computing resources deployed across various clusters (e.g., the clusters 108, 110) that are managed by the resource management system 112. For example, the resource management system 112 may monitor the computing resources R1A-R3C and/or the network devices 104, 106 and analyze a communications there-between. Further, the resource management system 112 may redeploy certain computing resources of the computing resources R1A-R3C such that the inter-cluster communication frequencies among the computing resources R1A-R3C and/or the network devices 104, 106 may be reduced and the performance of applications utilizing the computing resources R1A-R3C may be improved.

In order to enable redeployment of certain computing resources, in some examples, the resource management system 112 may receive data related to a performance parameter corresponding to the plurality of computing resources R1A-R3C from the respective host-computing nodes 102A-102C. The performance parameter may be associated with one or both of communication among computing resources of the plurality of computing resources R1A-R3C, or communication of the plurality of computing resources R1A-R3C with a network device such as the network devices 104, 106. Examples of the performance parameter associated with the communication among the computing resources R1A-R3C may include, but are not limited to, a communication frequency among the computing resources R1A-R3C, a network latency among the computing resources R1A-R3C, or both. For a first computing resource and a second computing resource of the computing resources R1A-R3C, the communication frequency of the first computing resource with the second computing resource may refer to a number of times per unit-time (e.g., second or minute) the first computing resource communicates with the second computing resource. Further, the term network latency for the communication between the first computing resource and the second computing resource may refer to a time that the first computing resource takes to communicate with the second computing resource.

Further, examples of the performance parameter associated with the communication of the computing resources R1A-R3C with the network device 104, 106 may include, but are not limited to, a frequency of access requests to the network device 104, 106, a network latency between the computing resources R1A-R3C and the network device 104, 106, or both. The term frequency of access requests for a given computing resource of the computing resources R1A-R3C may refer to a number of access requests per unit time (e.g., second or minute) to a given network device (e.g., network device 104 or 106). The term network latency for the communication between a given computing resource of the computing resources R1A-R3C and a given network device of the network devices 104, 106 may refer to a time that the given computing resource takes to communicate with the given network device.

In some examples, the resource management system 112 may receive data related to the performance parameter, for example, values of the communication frequency among the computing resources R1A-R3C, the network latency among the computing resources R1A-R3C, the frequency of access requests to the network device 104, 106, the network latency between the computing resources R1A-R3C and the network device 104, 106, or combinations thereof, from the respective host-computing nodes 102A-102C. The resource management system 112 may receive such data related to the performance parameter at fixed regular intervals, at random intervals, and/or upon request from the resource management system 112.

Further, in some examples, the resource management system 112 may determine, for a computing resource of the plurality of computing resources, a candidate host-computing node from the plurality of host-computing nodes 102A-102C based on the data related to the performance parameter. Based on the data related to the performance parameters noted hereinabove, the resource management system 112 may determine an affinity of the computing resource with respect to the host-computing nodes 102A-102C. The resource management system 112 may determine the candidate host-computing node for the computing resource based on its affinity with respect to the host-computing nodes 102A-102C. Further, in certain examples, the resource management system 112 may redeploy the computing resource on the candidate host-computing node.

For instance, in a given example scenario, the data related to the performance parameters noted hereinabove might indicate that computing resource R1B hosted on the host-computing node 102B communicates frequently with the computing resource R1A hosted on the host-computing node 102A. Further, the data related to the performance parameters noted hereinabove might also indicate that computing resource R4B hosted on the host-computing node 102B frequently accesses the network device 106 in the cluster 110. Moreover, the data related to the performance parameters noted hereinabove might also indicate that computing resource R2C hosted on the host-computing node 102C communicates frequently with the computing resource R2B on the host-computing node 102B and frequently accesses the network device 104 in the cluster 108.

Figure 2:
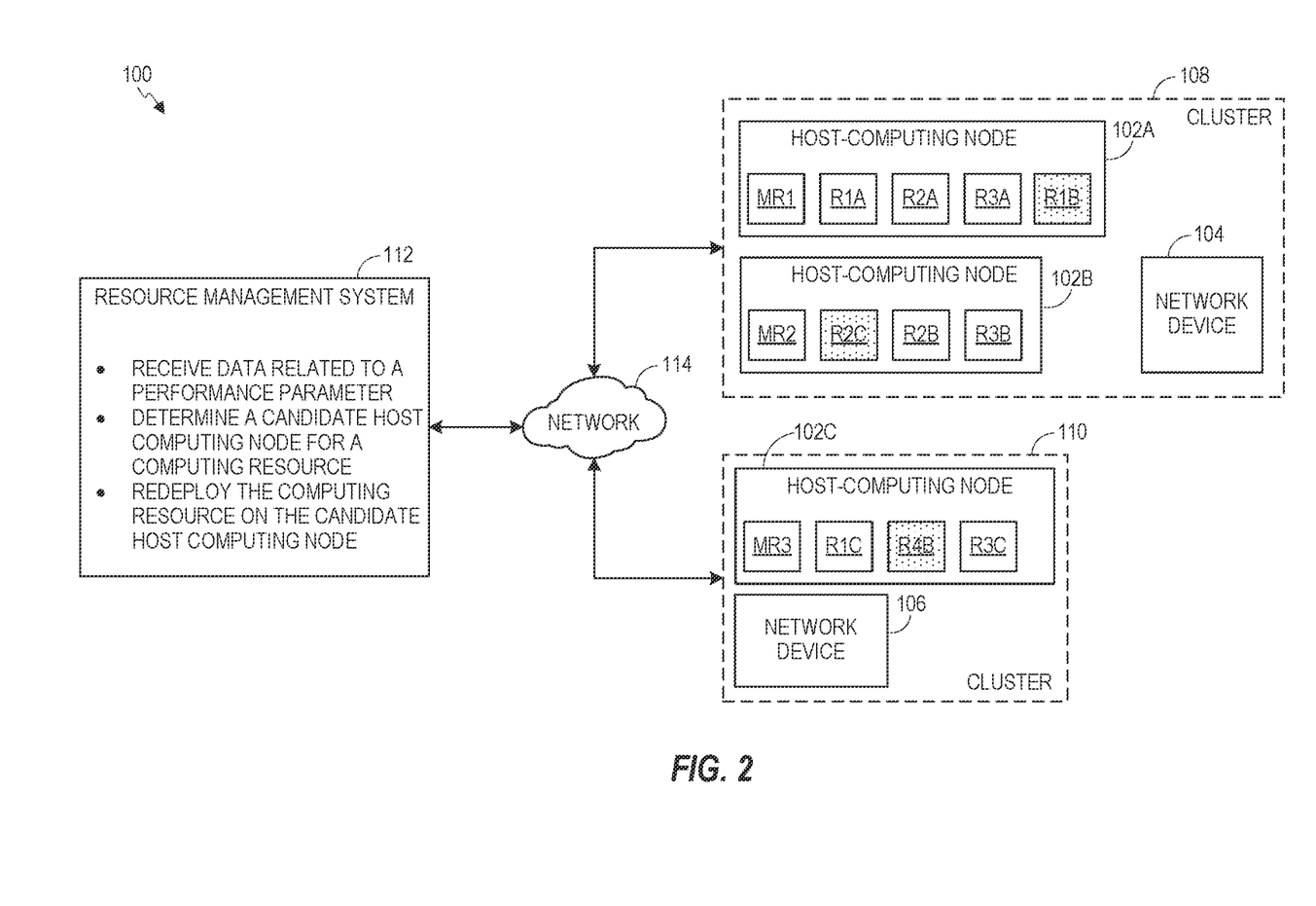
FIG. 2 depicts the networked system of FIG. 1 having the computing resources redeployed, in accordance with an example.

In the given example scenario, the resource management system 112, based on the data related to the performance parameter, may determine the host-computing nodes 102A, 102B, and 102C as the candidate host-computing nodes for the computing resources R1B, R2C, and R4B, respectively. Accordingly, the resource management system 112 may redeploy the computing resources R1B, R2C, and R4B respectively on the host-computing nodes 102A, 102B, and 102C (see FIG. 2). Referring now to FIG. 2, the networked system 100 of FIG. 1 is depicted with certain computing resources of the computing resources R1A-R3C as redeployed to different host-computing nodes, in accordance with an example. In the example of FIG. 2, the computing resource R1B is shown as redeployed on the host-computing node 102A. Further, the computing resource R2C is shown as redeployed on the host-computing node 102B. Furthermore, the computing resource R4B is shown as redeployed on the host-computing node 102C. In FIG. 2, the redeployed computing resources R1B, R2C, and R4B are marked with dotted pattern for illustration purposes. Additional details of determining the candidate host-computing nodes and redeploying the computing resources will be described in conjunction with the FIGS. 3-6.

As will be appreciated, the resource management system 112 in accordance with aspects of the present disclosure may facilitate enhanced redeployment of the computing resource so that inter-cluster communication frequencies among the computing resources R1A-R3C and/or the network devices 104, 106 may be reduced and the performance of applications utilizing the computing resources R1A-R3C may be improved. Such enhancement may be achieved, at least in part, as the candidate host-computing node for a given computing resource is determined considering the performance parameter that is associated with one or both of: communication between computing resources of the plurality of computing resources R1A-R3C, or communication of the plurality of computing resources R1A-R3C with the network devices 104, 106. Therefore, when a given computing resource is redeployed on the candidate host-computing node, communication frequency of the given computing resource with other computing nodes within the same cluster or outside of the cluster in which the candidate host-computing node resides may be reduced. Accordingly, performance of application(s) utilizing the given computing resource may be improved.

Figure 3:
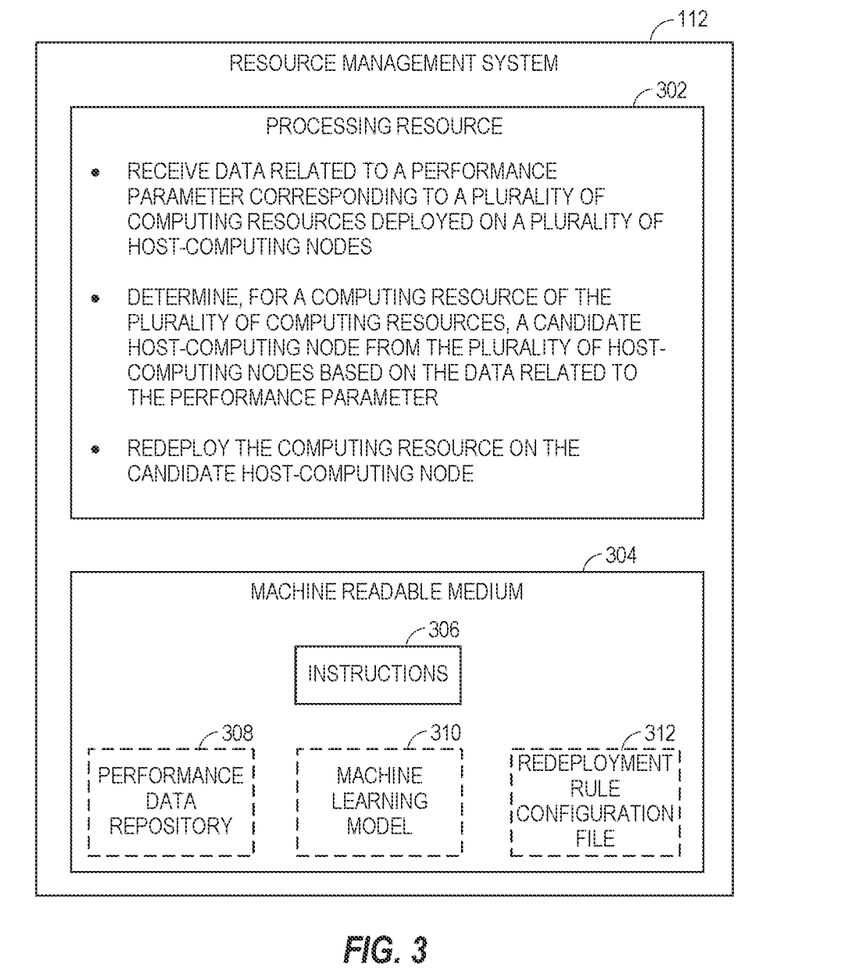
FIG. 3 depicts the resource management system of FIG. 1, in accordance with an example.

Referring now to FIG. 3, the resource management system 112 of FIG. 1 is depicted, in accordance with an example. The resource management system 112 may be a device including a processor or microcontroller and/or any other electronic component, or a device or system that may facilitate various compute and/or data storage services, for example. Examples of the resource management system 112 may include, but are not limited to, a desktop computer, a laptop, a smartphone, a server, a computer appliance, a workstation, a storage system, or a converged or hyperconverged system, and the like. In some examples, the resource management system 112 may include a processing resource 302 and a machine-readable medium 304.

The machine-readable medium 304 may be any electronic, magnetic, optical, or other physical storage device that may store data and/or executable instructions 306. For example, the machine-readable medium 304 may be a Random Access Memory (RAM), an Electrically Erasable Programmable Read-Only Memory (EEPROM), a storage drive, a flash memory, a Compact Disc Read Only Memory (CD-ROM), and the like. The machine-readable medium 304 may be non-transitory. As described in detail herein, the machine-readable medium 304 may be encoded with the executable instructions 306 to perform one or more methods, for example, methods described in FIGS. 4-6.

Further, the processing resource 302 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of retrieving and executing instructions 306 stored in the machine-readable medium 304, or combinations thereof. The processing resource 302 may fetch, decode, and execute the instructions 306 stored in the machine-readable medium 304 to redeploy certain computing resources of the computing resources R1A-R3C (described further below). As an alternative or in addition to executing the instructions 306, the processing resource 302 may include at least one integrated circuit (IC), control logic, electronic circuits, or combinations thereof that include a number of electronic components for performing the functionalities intended to be performed by the resource management system 112 (described further below).

In some examples, the resource management system 112 may receive data related to the performance parameter corresponding to the plurality of computing resources R1A-R3C deployed on the plurality of host-computing nodes 102A-102C. The performance parameter may be associated with one or both of: communication among computing resources of the plurality of computing resources R1A-R3C, or communication of the plurality of computing resources R1A-R3C with a network device such as the network devices 104, 106. In some examples, the processing resource 302 may execute the instructions 306 to deploy a monitoring resource on each of the plurality of host-computing nodes 102A-102C to monitor respective computing resources on the each of the plurality of host-computing nodes 102A-102C to generate the data related to the performance parameter. For example, the processing resource 302 may deploy monitoring resources MR1, MR2, and MR3 respectively on the host-computing nodes 102A, 102B, and 102C. The monitoring resources MR1, MR2, and MR3 may be a virtual machine, a container, or a pod.

The monitoring resources MR1, MR2, and MR3 may monitor the computing resources R1A-R3C on the respective host-computing nodes 102A-102C and generate data related the performance parameter for the computing resources based on the monitoring of the computing resources R1A-R3C. In the example of FIG. 1, the monitoring resource MR1 may monitor the computing resources, such as, the computing resources R1A, R2A, and R3A, which are hosted on the host-computing node 102A. Further, the monitoring resource MR2 may monitor the computing resources, such as, the computing resources R1B, R2B, R3B, and R4B, which are hosted on the host-computing node 102B. Moreover, the monitoring resource MR3 may monitor the computing resources, such as, the computing resources R1C, R2C, and R3C, which are hosted on the host-computing node 102C.

Further, in some examples, the monitoring resources MR1, MR2, and MR3 may send the data related to the performance parameter to the resource management system 112. The resource management system 112 may receive data related to the performance parameter from the monitoring resources MR1, MR2, and MR3 at fixed regular intervals, at random intervals, and/or upon request from the resource management system 112.

The machine-readable medium 304, in some examples, may include a performance data repository 308. The processing resource 302 may store or update the data related the performance parameters received from the monitoring resources MR1-MR3 in the performance data repository 308. Accordingly, the performance data repository 308 may include the data related the performance parameters corresponding to all of the computing resources R1A-R3C. Table-1 represented below depicts an example data related to the performance parameter (e.g., communication frequency among the computing resources and communication frequency of the computing resources with the network devices) corresponding to certain computing resources received from the respective monitoring resources and stored in the performance data repository 308.

TABLE 1

Example data related to performance parameter

| Computing Resource (CR) | Current Host | Communication history with other CRs | | Communication history with Network devices (CNDs) | |
|---|---|---|---|---|---|
| | | CR | Frequency (requests/second) | CND | Frequency (requests/second) |
| R2C | 102C | R2B | 10 | 104 | 17 |
| | | R1A | 5 | 106 | 8 |
| R1B | 102B | R1A | 20 | 104 | 5 |
| | | R1C | 2 | 106 | 0 |
| | | R3C | 0 | | |
| R4B | 102B | R1A | 1 | 104 | 2 |
| | | R1C | 2 | 106 | 20 |

In Table-1, it may be observed that the computing resource R2C that is currently hosted on the host-computing node 102C communicates more frequently with the computing resource R2B as compared to the computing resource R1A. Further, the computing resource R2C also frequently accesses the network device 104 in the cluster 108 in comparison to the network device 106. In addition, it may be observed that the computing resource R1B that is currently hosted on the host-computing node 102B communicates more frequently with the computing resource R1A as compared to the computing resources R1C and R3C. Moreover, it may be observed that the computing resource R4B that is currently hosted on the host-computing node 102B frequently accesses the network device 106 on a different cluster 110. Further, it may be noted that Table-1 represents an example portion of data for illustration purposes. The performance data repository 308 may store additional data related to various other performance parameters related to these and other computing resources.

Further, for a computing resource of the plurality of computing resources R1A-R3C, the resource management system 112 may determine a candidate host-computing node from the plurality of host-computing nodes 102A-102C based on the data related to the performance parameter. In some examples, the processing resource 302 may execute a machine-learning model 310 stored in the machine-readable medium 304 to aid in the determination of the candidate host-computing node for the computing resource based on the data related to the performance parameters.

In some examples, the processing resource 302 may execute the machine-learning model 310 to generate a redeployment recommendation corresponding to the computing resource based on the data related to the performance parameter. The redeployment recommendation may include an information of the candidate host-computing node on which the computing resource is to be redeployed. For example, for a given computing resource, the redeployment recommendation may be indicative of an identifier of a host-computing node on which the given computing resource should be redeployed.

In some examples, to generate the redeployment recommendation, the machine-learning model 310 may use the data stored in the performance data repository 308 as an input data or training data. In some examples, the machine-learning model 310 may be trained using the data related to the performance parameter stored in the performance data repository 308. Further, for each of the plurality of computing resources R1A-R3C, the processing resource 302 may first determine a node affinity metric corresponding to each of the plurality of host-computing nodes 102A-102C using the machine-learning model 310. The term, "node affinity metric" for a given computing resource may be indicative of how relevant a host-computing node is to the given computing resource so that if given computing resource is deployed on the host-computing node, the communication frequencies of the given computing resource with computing resources hosted on other host-computing nodes is minimized.

When the machine-learning model 310 is initialized, in some examples, the machine-learning model 310 may set values of the node affinity metric for the computing resources with respect to their current host-computing nodes to 1. For example, initially, for the resources R1A, R2A, and R3A, values of the node affinity metric with respect to the host-computing node 102A are set to 1 and the values of the node affinity metric with respect to other host-computing node 102B and 102C are set to 0. Similarly, for the resources R1B, R2B, R3B, and R4B the values of the node affinity metric with respect to the host-computing node 102B are set to 1 and the values of the node affinity metric with respect to other host-computing node 102A and 102C are set to 0. In the similar fashion, for the resources R1C, R2C, and R3C, the values of the node affinity metric with respect to the host-computing node 102C are set to 1 and the values of the node affinity metric with respect to other host-computing node 102A and 102B are set to 0.

Further, when the machine-learning model 310 is executed by the processing resource 302 for the data stored in performance data repository 308, the machine-learning model 310 may update the values of the node affinity metric for each of the computing resources R1A-R3C depending on the data corresponding to the performance parameter. Table-2 depicted below shows example values of the node affinity metrics corresponding to certain example computing resources with reference to the host-computing nodes 102A-102C.

TABLE 2

Node Affinity Metric data

| Computing Resource (CR) | Host-Computing Node 102A | Host-Computing Node 102B | Host-Computing Node 102C |
|---|---|---|---|
| R2C | 0.3 | 0.7 | 0.1 |
| R1B | 0.6 | 0.1 | 0.2 |
| R4B | 0.1 | 0.3 | 0.8 |

In general, in Table-2, it can be observed that values of the node affinity metrics for the computing resources R2C, R1B, and R4B with respect to their current host-computing nodes have reduced, while their affinity to other host-computing nodes has increased based on how these computing resources R2C, R1B, and R4B have communicated with computing resources on other host-computing nodes over a period of time. For example, in Table-2, it can be observed that the computing resource R2C (currently hosted on the host-computing node 102C) is identified to have highest value (e.g., 0.7) of the node affinity metric for the host-computing node 102B which is validated by of the fact that the computing resource R2C communicates frequently with the computing resource R2B hosed on the host-computing node 102B and also frequently accessed the network device 104 in the cluster 108 (see Table 1). Similarly, it can also be observed that the computing resource R1B (currently hosted on the host-computing node 102B) is identified to have highest value (e.g., 0.6) of the node affinity metric for the host-computing node 102A which is validated by of the fact that the computing resource R1B communicates frequently with the computing resource R1A hosed on the host-computing node 102A (see Table 1). Moreover, it can be observed that the computing resource R4B currently hosted on the host-computing node 102B) is identified to have highest value (e.g., 0.8) of the node affinity metric for the host-computing node 102C which is validated by of the fact that the computing resource R4B frequently access the network device 106 in the cluster 110 (see Table 1).

The processing resource 302 may identify a candidate host-computing node corresponding to a given computing resource based on the values of the node affinity metrics of the given computing resource corresponding to the host-computing nodes 102A-102C. In some examples, the processing resource 302 may identify, for the given computing resource, a host-computing node corresponding to which the given computing resource has the highest value of the node affinity metric as a candidate host-computing node. In the example of Table-2, for the computing resources R2C, R1B, and R4B, the processing resource 302 may identify the host-computing nodes 102B, 102A, and 102C, respectively, as the candidate host-computing nodes. In certain other examples, the processing resource 302 may compare the values of the node affinity metric with a threshold value to determine whether a value of the node affinity metric corresponding to any host-computing node exceeds the threshold value. Accordingly, for the given computing resource, a host-computing node having a node affinity value greater than the threshold value will be identified as the candidate host-computing node for the given computing resource.

Further, in some examples, once the candidate host-computing nodes are determined for one or more computing resources, the processing resource 302 may generate the redeployment recommendation including the information of the candidate host-computing node on which the one or more computing resources are to be redeployed. Table-3 depicted below represents example redeployment recommendations.

TABLE 3

Example redeployment recommendations

| Computing Resource (CR) | Redeployment Recommendation |
|---|---|
| R2C | Redeploy R2C on the host-computing node 102B |
| R1B | Redeploy R1B on the host-computing node 102A |
| R4B | Redeploy R4B on the host-computing node 102C |

As depicted in Table-3, the computing resources R2C, R1B, and R4B are recommended to be redeployed on the identified candidate host-computing nodes 102B, 102A, and 102C, respectively. In some examples, the processing resource 302 may store the redeployment recommendation in a redeployment rule configuration file 312 stored in the machine-readable medium 304. In some examples, the processing resource 302 may store a list of computing resources identified be redeployed (e.g., the computing resources R2C, R1B, and R4B) and information corresponding candidate host-computing nodes (e.g., the candidate host-computing nodes 102B, 102A, and 102C) in the redeployment rule configuration file 312.

Furthermore, the resource management system 112 may redeploy the computing resource on the candidate host-computing node. For example, the processing resource 302 may redeploy the computing resources R2C, R1B, and R4B on the identified candidate host-computing nodes 102B, 102A, and 102C, respectively. The processing resource 302 may conduct the redeployment action at regular intervals or upon a request from an administrator user. Accordingly, in some examples, the processing resource 302 may access the redeployment rule configuration file 312 from the machine-readable medium 304. Further, the processing resource 302 may redeploy the computing resources identified in the redeployment recommendation stored in the redeployment rule configuration file 312 to the respective candidate host-computing nodes. For example, the computing resources R2C, R1B, and R4B are redeployed on the candidate host-computing nodes 102B, 102A, and 102C, respectively (see FIG. 2).

Figure 4:
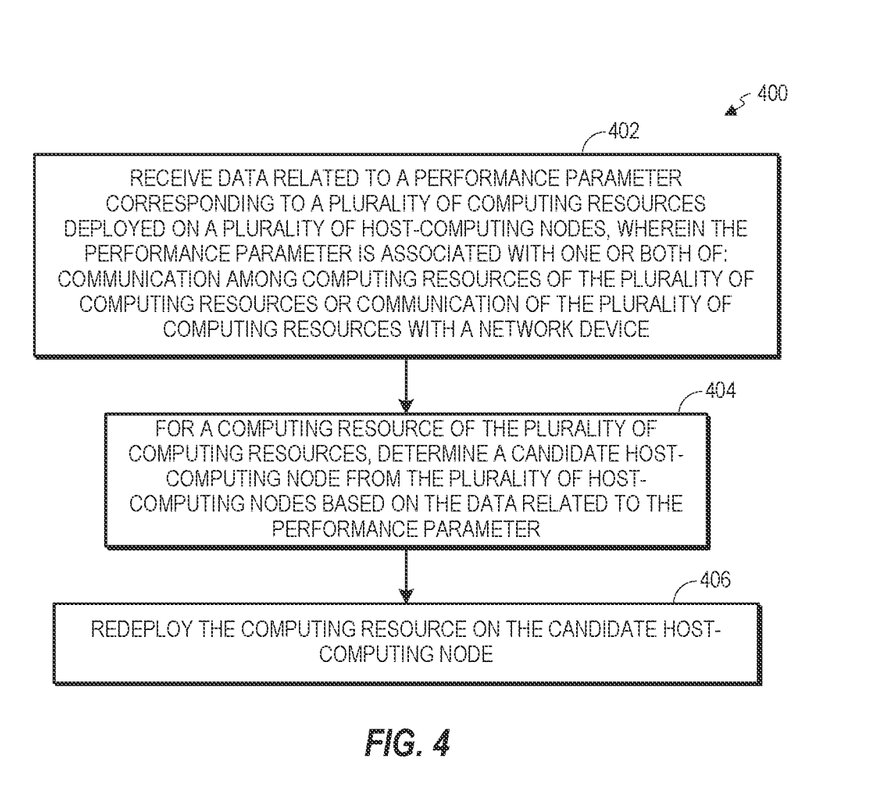
FIG. 4 is a flow diagram depicting a method for redeploying computing resources, in accordance with an example.

Referring now to FIG. 4, a flow diagram depicting a method 400 for redeploying a computing resource is presented, in accordance with an example. For illustration purposes, the method 400 will be described in conjunction with the networked system 100 of FIG. 1 and further in view of the structural details of the resource management system 112 described in FIG. 3. The method 400 may include method blocks 402, 404, and 406 (hereinafter collectively referred to as blocks 402-406) which may be performed by a processor-based system, for example, the resource management system 112. In particular, operations at each of the method blocks 402-406 may be performed by the processing resource 302 by executing the instructions 306 stored in the machine-readable medium 304 (see FIG. 3).

At block 402, the resource management system 112 may receive data related to a performance parameter corresponding to a plurality of computing resources R1A-R3C deployed on the plurality of host-computing nodes 102A-102C. The performance parameter may be associated with one or both of: communication among computing resources of the plurality of computing resources R1A-R3C, or communication of the plurality of computing resources R1A-R3C with a network device such as the network devices 104, 106. The data related to a performance parameter may include a value of the performance parameter. Further, at block 404, the resource management system 112 may determine, for a computing resource of the plurality of computing resources R1A-R3C, a candidate host-computing node from the plurality of host-computing nodes 102A-102C based on the data related to the performance parameter. Furthermore, at block 406, the resource management system 112 may redeploy the computing resource on the candidate host-computing node. Additional details of determining the candidate host-computing node and the redeploying the computing resource are described in FIGS. 3, 5, and 6.

Figure 5:
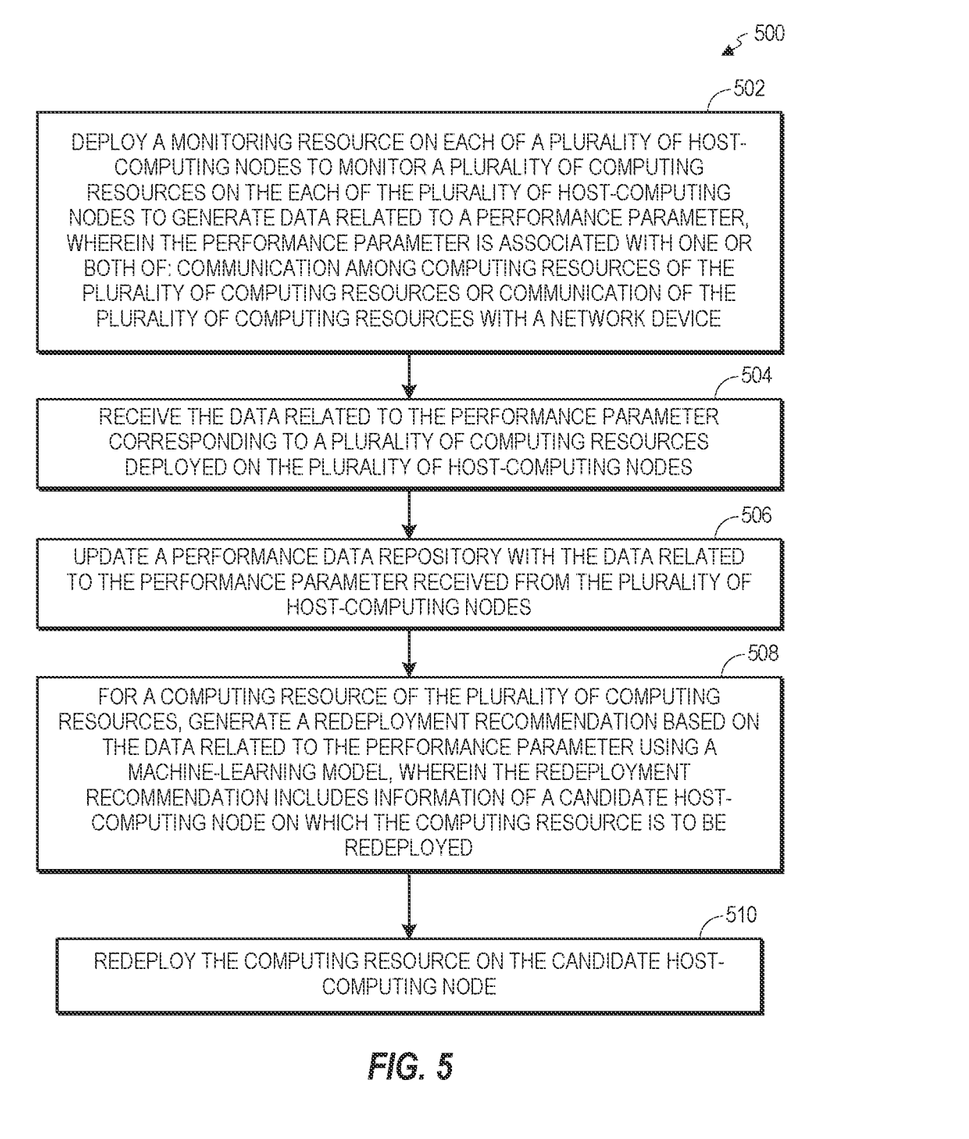
FIG. 5 is a flow diagram depicting a method for redeploying computing resources, in accordance with another example.

Moving now to FIG. 5, a flow diagram depicting a method 500 for redeploying a computing resource is presented, in accordance with another example. For illustration purposes, the method 500 will be described in conjunction with the networked system 100 of FIG. 1 and further in view of the structural details of the resource management system 112 described in FIG. 3. The method 500 may include method blocks 502, 504, 506, 508, and 510 (hereinafter collectively referred to as blocks 502-510), which may be performed by a processor-based system, for example, the resource management system 112. In particular, operations at the method blocks 502-510 may be performed by the processing resource 302 by executing the instructions 306 stored in the machine-readable medium 304.

At block 502, the resource management system 112 may deploy a monitoring resource on each of the plurality of host-computing nodes 102A-102C to monitor computing resources R1A-R3C to generate the data related to the performance parameter. For example, the resource management system 112 may deploy the monitoring resources MR1, MR2, and MR3 respectively on the host-computing nodes 102A, 102B, and 102C. These monitoring resources MR1, MR2, and MR3 may monitor the computing resources respectively on the host-computing nodes 102A, 102B, and 102C to generate data related to the performance parameter associated with one or both of communication among the computing resources of the plurality of computing resources R1A-R3C, or communication of the plurality of computing resources R1A-R3C with the network devices 104, 106. Further, the monitoring resources MR1, MR2, and MR3 may communicate the data related to the performance parameter to the resource management system 112. Further, at block 504, the resource management system 112 may receive the data related to the performance parameter from the monitoring resources MR1, MR2, and MR3.

At block 506, the resource management system 112 may update the performance data repository 308 with the data related to the performance parameter received from the plurality of host-computing nodes 102A-102C. Further, at block 508, the resource management system 112 may generate, for a computing resource, a redeployment recommendation based on the data related to the performance parameter using a machine-learning model 310 in a similar fashion as described in FIG. 3. The redeployment recommendation (see Table-3) may include information of the candidate host-computing node on which the computing resource is to be redeployed. In some examples, the redeployment recommendation may be stored in the redeployment rule configuration file 312. Various operations performed by the resource management system 112 to generate the redeployment recommendation are described in conjunction with a method in FIG. 6.

Moreover, at block 510, the computing resource may be redeployed by the resource management system 112 on the candidate host-computing node based on the redeployment recommendation. The resource management system 112 may access the redeployment rule configuration file 312 to determine the one or more computing resources to be redeployed and respective candidate host-computing nodes on which the computing resources are to be redeployed. In some examples, the resource management system 112 may define and operationalize the computing resources that are identified to be redeployed on the respective candidate host-computing nodes. Once the computing resource are operationalized on the respective candidate host-computing nodes, the resource management system 112 may and remove these redeployed computing resources from their respective original host-computing nodes.

Figure 6:
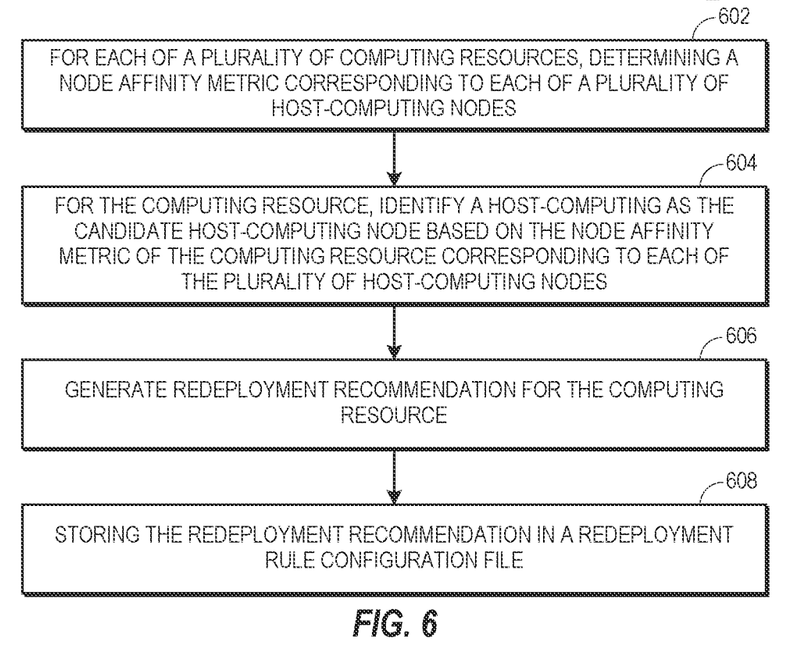
FIG. 6 is a flow diagram depicting a method for generating a redeployment recommendation, in accordance with an example.

Further, in FIG. 6, a flow diagram depicting a method 600 for generating a redeployment recommendation is presented, in accordance with an example. In some examples, the method 600 may include method sub-blocks of for performing the operation at block 508 of the method 500. At block 602, the resource management system 112 may determine, for each of the plurality of the computing resources R1A-R3C, the node affinity metric (see Table-2) corresponding to each of the plurality of host-computing nodes 102A-102C using the machine-learning model 310 based on the data related to the performance parameter. Details of determining the node affinity metric are described in conjunction with FIG. 3.

Further, at block 604, the resource management system 112 may identify, for a given computing resource of the computing resources R1A-R3C, a candidate host-computing node from the host-computing nodes 102A-102C based on respective values of the node affinity metric. In some examples, the resource management system 112 may identify, for the given computing resource, a host-computing node corresponding to which the given computing resource has the highest value of the node affinity metric as a candidate host-computing node. In the example of Table-2, for the computing resources R2C, R1B, and R4B, the processing resource 302 may identify the host-computing nodes 102B, 102A, and 102C, respectively, as the candidate host-computing nodes. In certain other examples, the resource management system 112 may compare the values of the node affinity metric with a threshold value to determine whether a value of the node affinity metric corresponding to any host-computing node exceeds the threshold value.

Accordingly, for the given computing resource, a host-computing node having a node affinity value greater than the threshold value will be identified as the candidate host-computing node for the given computing resource.

Once the candidate host-computing node is identified for the given computing resource, at block 606, the resource management system 112 may generate a redeployment recommendation. The redeployment recommendation may include information of the candidate host-computing node on which the computing resource is to be redeployed (see Table-3). Further, in some examples, at block 608, the resource management system 112 may store the redeployment recommendation in a redeployment rule configuration file 312. The redeployment rule configuration file 312 may be accessed to cause redeployment of the computing resources identified to the redeployed.

Figure 7:
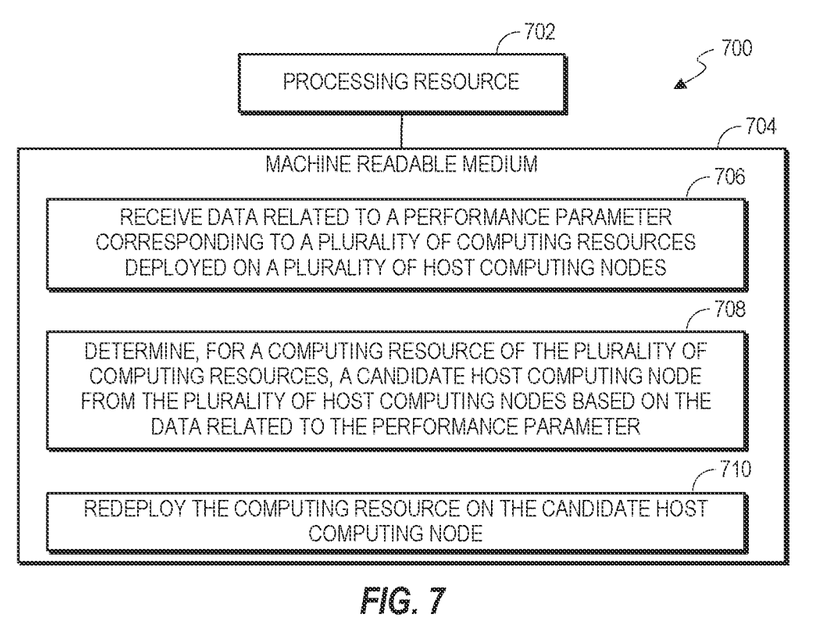
FIG. 7 is a block diagram depicting a processing resource and a machine-readable medium encoded with example instructions to redeploying computing resources, in accordance with an example It is emphasized that, in the drawings, various features are not drawn to scale. In fact, in the drawings, the dimensions of the various features have been arbitrarily increased or reduced for clarity of discussion.

Moving to FIG. 7, a block diagram 700 depicting a processing resource 702 and a machine-readable medium 704 encoded with example instructions to redeploy a computing resource is presented, in accordance with an example. The machine-readable medium 704 may be non-transitory and is alternatively referred to as a non-transitory machine-readable medium 704. In some examples, the machine-readable medium 704 may be accessed by the processing resource 702. In some examples, the processing resource 702 may represent one example of the processing resource 302 of the resource management system 112. Further, the machine-readable medium 704 may represent one example of the machine-readable medium 304 of the resource management system 112.

The machine-readable medium 704 may be any electronic, magnetic, optical, or other physical storage device that may store data and/or executable instructions. Therefore, the machine-readable medium 704 may be, for example, RAM, an EEPROM, a storage drive, a flash memory, a CD-ROM, and the like. As described in detail herein, the machine-readable medium 704 may be encoded with executable instructions 706, 708, and 710 (hereinafter collectively referred to as instructions 706-710) for performing the method 400 described in FIG. 3. Although not shown, in some examples, the machine-readable medium 704 may be encoded with certain additional executable instructions to perform the method 500 of FIG. 5, the method 600 of FIG. 6, and/or any other operations performed by the resource management system 112, without limiting the scope of the present disclosure.

The processing resource 702 may be a physical device, for example, one or more CPU, one or more semiconductor-based microprocessor, one or more GPU, ASIC, FPGA, other hardware devices capable of retrieving and executing the instructions 706-710 stored in the machine-readable medium 704, or combinations thereof. In some examples, the processing resource 702 may fetch, decode, and execute the instructions 706-710 stored in the machine-readable medium 704 to redeploy certain computing resources of the computing resources R1A-R3C. In certain examples, as an alternative or in addition to retrieving and executing the instructions 706-710, the processing resource 702 may include at least one IC, other control logic, other electronic circuits, or combinations thereof that include a number of electronic components for performing the functionalities intended to be performed by the resource management system 112 of FIG. 1.

The instructions 706 when executed by the processing resource 702 may cause the processing resource 702 to receive data related to a performance parameter corresponding to the plurality of computing resources R1A-R3C deployed on the plurality of host-computing nodes 102A-102C. The performance parameter may be associated with one or both of: communication among computing resources of the plurality of computing resources R1A-R3C, or communication of the plurality of computing resources R1A-R3C with a network device such as the network device 104, 106. Further, the instructions 708 when executed by the processing resource 702 may cause the processing resource 702 to determine, for a computing resource of the plurality of computing resources R1A-R3C, a candidate host-computing node from the plurality of host-computing nodes 102A-102C based on the data related to the performance parameter. Details of determining the candidate host-computing node are described in detail in conjunction with FIGS. 3, 5 and 6. Moreover, the instructions 710 when executed by the processing resource 702 may cause the processing resource 702 to redeploy the computing resource on the candidate host-computing node.

As will be appreciated, the resource management system 112, the methods 400, 500, and 600, and the non-transitory machine-readable medium 704 in accordance with aspects of the present disclosure may facilitate enhanced redeployment of the computing resource so that inter-cluster communication frequencies among the computing resources R1A-R3C and/or the network devices 104, 106 may be reduced and the performance of applications utilizing the computing resources R1A-R3C may be improved. Such enhancement may be achieved, at least in part, as the candidate host-computing node for a given computing resource is determined considering the performance parameter that is associated with one or both of: communication between computing resources of the plurality of computing resources R1A-R3C, or communication of the plurality of computing resources R1A-R3C with the network devices 104, 106. Therefore, when a given computing resource is redeployed on the candidate host-computing node, communication frequency of the given computing resource with other computing nodes within the same cluster or outside of the cluster in which the candidate host-computing node resides may be reduced. Accordingly, performance of application(s) utilizing the given computing resource may be improved. Further, use of the machine-learning model 310 continuously improves accuracy of the redeployment recommendations, thereby further enhancing the redeployment of the computing resources.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

We claim:

1. A resource management system comprising:
a machine-readable medium storing executable instructions; and
a processing resource coupled to the machine-readable medium to execute the instructions to:
receive data representing a performance parameter, wherein the performance parameter represents at least one of a communication frequency between a first computing resource of a plurality of computing resources deployed on a plurality of host-computing nodes and a second computing resource of the plurality of computing resources, a time that the first computing resource takes to communicate with the second computing resource, respective frequencies of access requests by each of the first and second computing devices to a network access device accessible by the first and second computing devices, or respective times that each of the first and second computing devices takes to communicate with the network access device; and
determine, for a third computing resource of the plurality of computing resources, a candidate host-computing node from the plurality of host-computing nodes based on the performance parameter; and
redeploy the third computing resource on the candidate host-computing node.

2. The resource management system of claim 1, wherein the processing resource executes the instructions to:
deploy a monitoring resource on each host-computing node of the plurality of host-computing nodes to monitor computing resources on the each host-computing node of the plurality of host-computing nodes to generate the data representing the performance parameter; and
receive the data representing the performance parameter from the monitoring resource.

3. The resource management system of claim 1, wherein the machine-readable medium further comprises a performance data repository and, and wherein the processing resource executes the instructions to update the performance data repository with the data representing the performance parameter.

4. The resource management system of claim 3, wherein the machine-readable medium further comprises a machine-learning model, and wherein the processing resource executes the instructions to generate a redeployment recommendation corresponding to the third computing resource, using the machine-learning model, based on the data representing the performance parameter, and wherein the third computing resource is redeployed based on the redeployment recommendation.

5. The resource management system of claim 1, wherein the plurality of computing resources comprises a virtual machine, a container, or a pod.

6. The resource management system of claim 1, wherein the network device comprises a storage system.

7. The resource management system of claim 1, wherein:
the plurality of host-computing nodes comprises a first host-computing node that includes the first computing resource;
the plurality of host-computing nodes comprises a second host-computing node that includes the second computing resource;
the first host-computing node is a member of a first cluster;
the second host-computing node is a member of a second cluster other than the first cluster; and
the processing resource to further execute the instructions to determine the candidate host-computing node to reduce a communication frequency among the first and second clusters.

8. A method comprising:
receiving, by a resource management system, data representing a performance parameter, wherein the performance parameter represents at least one of a communication frequency between a first computing resource of a plurality of computing resources deployed on a plurality of host-computing nodes and a second computing resource of the plurality of computing resources, a time that the first computing resource takes to communicate with the second computing resource, respective frequencies of access requests by each of the first and second computing devices to a network access device accessible by the first and second computing devices, or respective times that each of the first and second computing devices takes to communicate with the network access device;
for a third computing resource of the plurality of computing resources, determining, by the resource management system, a candidate host-computing node from the plurality of host-computing nodes based on the performance parameter; and
redeploying, by the resource management system, the third computing resource on the candidate host-computing node.

9. The method of claim 8, further comprising deploying a monitoring resource on each host-computing node of the plurality of host-computing nodes to monitor computing resources on the each host-computing node of the plurality of host-computing nodes to generate the data representing the performance parameter.

10. The method of claim 9, wherein the monitoring resource comprises a computing resource, a container, or an application.

11. The method of claim 8, further comprising:
updating, by the resource management system, a performance data repository with the data representing the performance parameter; and
generating a redeployment recommendation, by the resource management system, for the third computing resource based on the data representing the performance parameter using a machine-learning model, wherein the redeployment recommendation comprises information of the candidate host-computing node on which the third computing resource is to be redeployed, and wherein the third computing resource is redeployed on the candidate host-computing node based on the redeployment recommendation.

12. The method of claim 11, further comprising training the machine-learning model using the data representing the performance parameter.

13. The method of claim 11, wherein generating the redeployment recommendation comprises:
for each computing resource of the plurality of computing resources, determining a node affinity metric corresponding to each host-computing node of the plurality of host-computing nodes using the machine-learning model based on the data representing the performance parameter; and
for the third computing resource, identifying a host-computing node from the plurality of host computing nodes as the candidate host-computing node based on the node affinity metric of the third computing resource corresponding to each host-computing node of the plurality of host-computing nodes.

14. The method of claim 8, wherein the plurality of host-computing nodes are arranged in a plurality of clusters, wherein the third computing resource is hosted on a first cluster of the plurality of clusters, wherein the candidate host-computing node for the third computing resource is identified from the first cluster or from a second cluster of the plurality of clusters.

15. A non-transitory machine-readable medium storing instructions executable by a processing resource, the instructions comprising:
  instructions to receive data representing a performance parameter, wherein the performance parameter represents at least one of a communication frequency between a first computing resource of a plurality of computing resources deployed on a plurality of host-computing nodes and a second computing resource of the plurality of computing resources, a time that the first computing resource takes to communicate with the second computing resource, respective frequencies of access requests by each of the first and second computing devices to a network access device accessible by the first and second computing devices, or respective times that each of the first and second computing devices takes to communicate with the network access device;
  instructions to determine, for a third computing resource of the plurality of computing resources, a candidate host-computing node from the plurality of host-computing nodes based on the performance parameter; and
  instructions to redeploy the computing resource on the third candidate host-computing node.

16. The non-transitory machine-readable medium of claim 15, further comprising instructions to deploy a monitoring resource on each host-computing node of the plurality of host-computing nodes to monitor the computing resources on respective host-computing nodes to generate the data representing the performance parameter.

17. The non-transitory machine-readable medium of claim 15, further comprising instructions to:
  update a performance data repository with the data representing the performance parameter; and
  generate a redeployment recommendation for the third computing resource based on the data representing the performance parameter using a machine-learning model, wherein the redeployment recommendation comprises information of the candidate host-computing node on which the third computing resource is to be redeployed, and wherein the computing resource is redeployed on the candidate host-computing node based on the redeployment recommendation.

18. The non-transitory machine-readable medium of claim 17, wherein the instructions to generate the redeployment recommendation further comprises instructions to:
  for each computing resource of the plurality of computing resources, determine a node affinity metric corresponding to each host-computing node of the plurality of host-computing nodes using the machine-learning model based on the data representing the performance parameter; and
  for the third computing resource, identify a host-computing node from the plurality of host-computing nodes as the candidate host-computing node based on the node affinity metric of the third computing resource corresponding to each host-computing node of the plurality of host-computing nodes.

\* \* \* \* \*